(12) United States Patent
Smith et al.

(10) Patent No.: US 10,477,024 B1
(45) Date of Patent: Nov. 12, 2019

(54) DYNAMIC RESOURCE ALLOCATION (71) Applicant: United Services Automobile Association (USAA), San Antonio, TX (US)

(72) Inventors: Eric J. Smith, Helotes, TX (US); John McChesney TenEyck, Jr., San Antonio, TX (US); Gregory Yarbrough, San Antonio, TX (US); Vijay Jayapalan, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 15/981,477

(22) Filed: May 16, 2018

Related U.S. Application Data (60) Provisional application No. 62/512,578, filed on May 30, 2017.

(51) Int. Cl.
*H04M 3/523* (2006.01)

(52) U.S. Cl.
CPC .... *H04M 3/5232* (2013.01); *H04M 2203/402* (2013.01)

(58) Field of Classification Search
CPC ......... H04M 3/5232; H04M 2203/402; H04M 3/523
USPC ............ 379/266.01, 265.11, 265.12, 265.05, 379/265.01, 266.02, 266.03
See application file for complete search history.

(56) References Cited

U.S. PATENT DOCUMENTS

| | | | |
|---|---|---|---|
| 2002/0131399 A1* | 9/2002 | Philonenko | H04L 29/06 370/351 |
| 2012/0297395 A1* | 11/2012 | Marchand | G06F 9/5027 718/104 |
| 2016/0180381 A1* | 6/2016 | Kaiser | G06Q 30/0255 705/14.53 |
| 2018/0330278 A1 | 11/2018 | Ghajar | |

\* cited by examiner

*Primary Examiner* — Thjuan K Addy
(74) *Attorney, Agent, or Firm* — Fish & Richardson P.C.

(57) ABSTRACT

Methods, systems, and apparatus, including computer programs encoded on computer storage media are used for coordinating callers with customer service representatives. One of the methods includes identifying a number of callers. The method also includes dynamically adjusting a number of customer service representatives based on the number of callers.

18 Claims, 5 Drawing Sheets

DYNAMIC RESOURCE ALLOCATION

CROSS-REFERENCE TO RELATED APPLICATION

This application claims priority to U.S. Application Ser. No. 62/512,578, filed on May 30, 2017, the entirety of which is incorporated by reference into the present disclosure.

BACKGROUND

A call center is a centralized office used for receiving or transmitting a large volume of requests by telephone. An inbound call center is operated by a company to administer incoming product support or information inquiries from consumers.

In virtual call center model, agents connect to the vendor's equipment through traditional telephone lines, or over voice over IP. Calls to and from prospects or contacts originate from or terminate at the vendor's data center, rather than at the call center operator's premises. The vendor's telephony equipment then connects the calls to the call center operator's agents.

Virtual call center technology allows people to work from home, instead of in a traditional, centralized, call center location, which increasingly allows people with physical or other disabilities that prevent them from leaving the house, to work. The only required equipment is Internet access and a workstation. The companies are preferring Virtual Call Center services due to cost advantage.

SUMMARY

This specification describes technologies relating to automated dynamic call centers.

In one implementation, the subject matter described in the detailed description includes methods that include the acts of identifying a number of callers. The methods include the acts of dynamically adjusting a number of customer service representatives based on the number of callers.

Particular embodiments of the subject matter described in this specification can be implemented so as to realize one or more of the following advantages. The methods may include the acts of establishing a price for a call between one of the callers and one of the customer service representatives, determining the number of customer service representatives is insufficient for the number of callers, and/or increasing the price. The methods may include the acts of organizing a plurality of callers into a demand block based on the time the caller called and/or assigning the demand block to a mining node based on a proof of work function that comprises at least one of showing that the mining node has the capacity to queue the plurality of callers. The methods may include the acts of organizing a plurality of customer service representatives into a supply block based on the time the customer service representative indicated a wiliness to receive calls. The methods may include the acts of matching a caller to a customer service representative using a swarm algorithm. Matching a caller to a customer service representative may be based on the type of the call, the qualifications of the customer service representative, a bid, and an ask.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A dynamic automated call distributor (ACD) can support a dynamic number of decentralized customer service representatives. The dynamic ACD can manage a number of potential customer services representatives available to handle calls remotely, for example, while working from home or from another remote location. This dynamic ad-hoc arrangement enables flexibility for the customer service representative while enabling the ACD to meet service level agreements with respect to call wait time (and other factors) while minimizing the out of pocket costs. The customer service representative can determine when they want to work and the minimum amount of money that they are willing to work for. For example, the customer service representatives can be paid on a per-call basis. This enables the call center to manage their call capacity dynamically.

Figure 1:
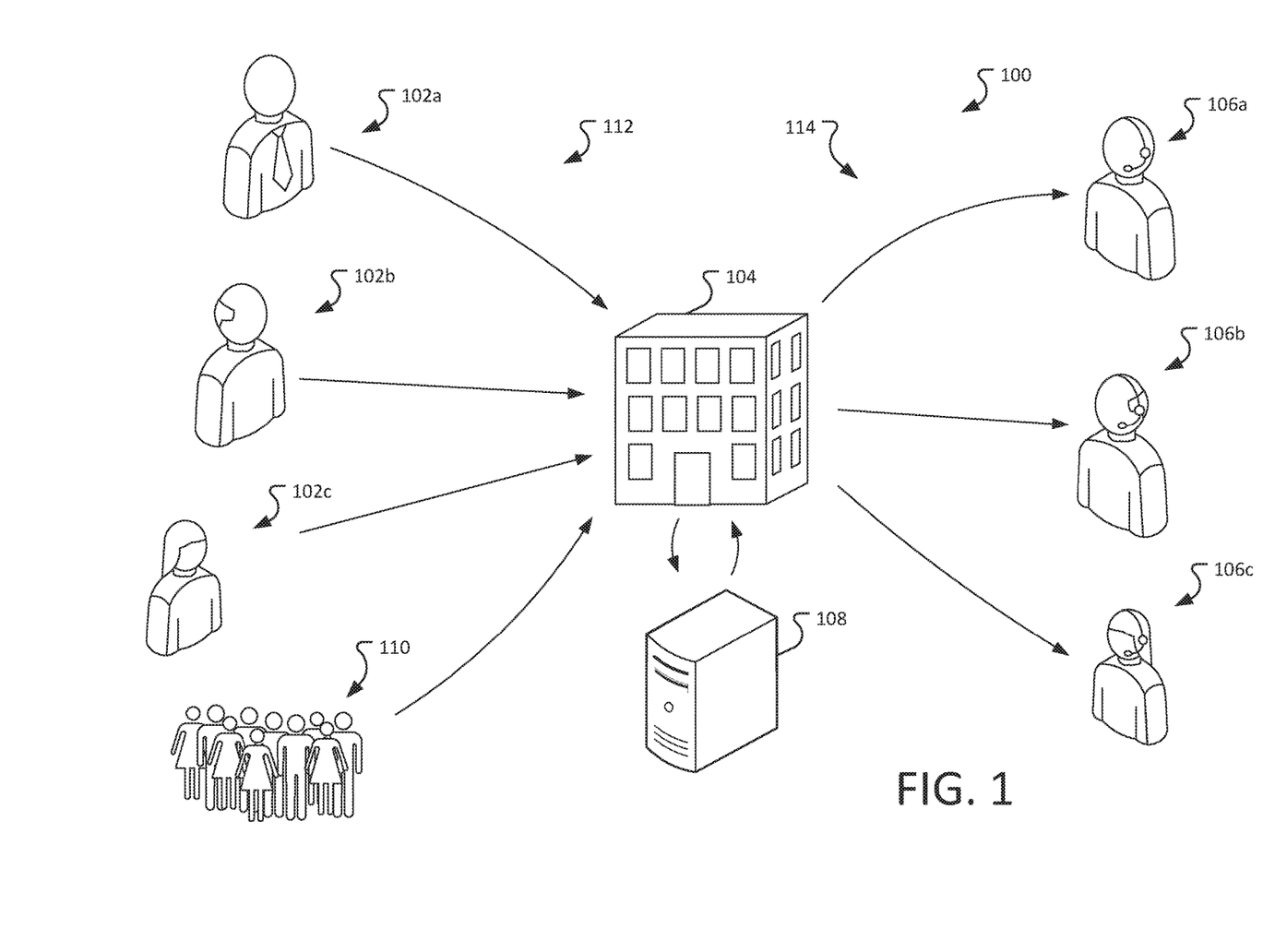
FIG. 1 illustrates an example call center environment with dynamic resource management.

FIG. 1 illustrates an example call center environment 100 with dynamic resource management. During normal call loads, callers 112 (as represented by individual callers 102a-c) call the call center 104 (or company) and are routed to customer service representatives (CSRs) 114 (represented by CSRs 106a-c). Callers 112 represent the demand for customer service capabilities and the CSRs represent the supply of customer service capabilities. When the demand for customer service exceeds the supply of CSRs, callers can be routed into a queuing system 108. The queuing system can play music for the caller while they wait, and/or can present self-service options.

While under normal circumstances, call volume can be generally predicted. However, circumstances can occur where demand for customer service can suddenly increase, resulting in a large number of additional callers (represented by the crowd 110) to call the call center 104. For example, news that a retail chain had credit card numbers hacked or a natural disaster can cause the volume of calls to rise precipitously.

In a conventional call center, these callers would spend an excessive amount of time in a queue or can receive a busy signal when the queuing system is overloaded. However, the call center environment 100 includes the capability to dynamically assign additional CSRs 114 to handle the additional call volume, as explained further below. Further, the call center can allocate additional computer systems to handle queueing and managing the increased call volume.

At the same time, calls to a call center may be lower than expected. For example, due to a school vacation week, the start of a sporting season, etc. Under these circumstance, the call center can reduce the number of CSRs 114.

Figure 2:
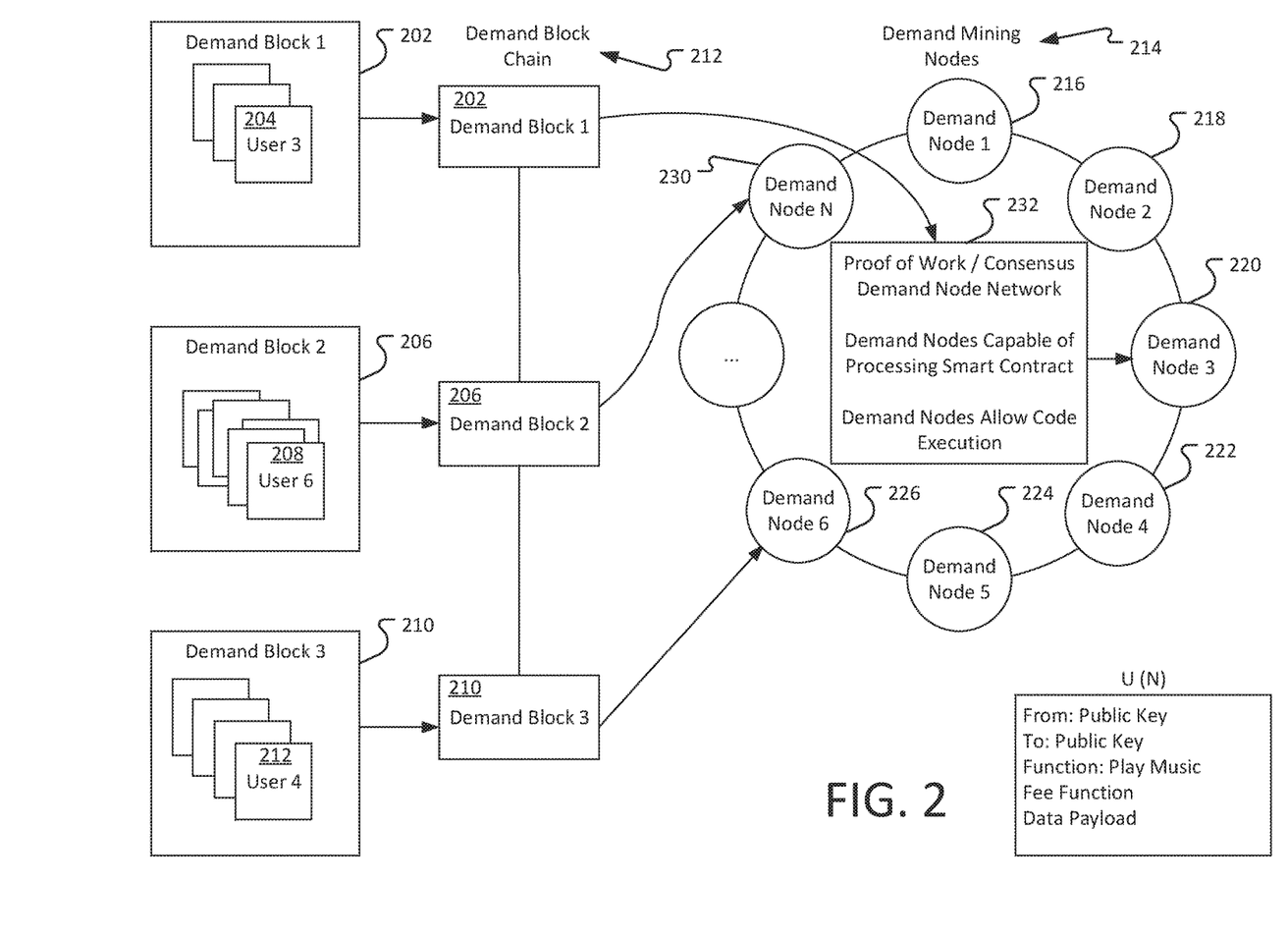
FIG. 2 illustrates an example system for allocating callers to different processing machine, referred to as nodes).

FIG. 2 illustrates an example system for allocating callers to different processing machine, referred to as nodes). When a caller calls into the call center, the caller can be grouped with other callers into demand blocks in a block chain.

To provide some basic context into blockchain technologies, in general, a blockchain is a public or private ledger of all transactions that have been executed in one or more contexts (e.g., negotiable instrument transactions, digital currency transactions, access determinations, instances of providing access, calls to a call center, customer service reps signing into a call center etc.). A blockchain can grow as completed blocks are added with a new set of transactions. In some examples, a single block is provided from multiple transactions (e.g., multiple callers into a call center). In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions. Each node maintains a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because all entities on the blockchain network can need to know all previous transactions to validate a requested transaction, all entities must agree on which transactions have actually occurred, and in which order. For example, if two entities observe different transaction histories, they will be unable to come to the same conclusion regarding the validity of a transaction. The blockchain enables all entities to come to an agreement as to transactions that have already occurred, and in which order. In short, and as described in further detail below, a ledger of transactions is agreed to based on the amount of work required to add a transaction to the ledger of transactions (e.g., add a block to the blockchain). Blockchains can also employ other protocols. In this context, the work is a task that is difficult for any single node (e.g., computing device) in the peer-to-peer network to quickly complete, but is relatively easy for a node (e.g., computing device) to verify.

The peer-to-peer network includes so-called miners (e.g., computing devices) that add blocks to a blockchain based on the blockchain protocol. In general, multiple miners validate transactions that are to be added to a block, and compete (e.g., perform work, as introduced above) to have their block added to the blockchain. A blockchain protocol includes a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value, in that the hash value cannot be 'un-hashed' to determine what the input was. The blockchain protocol can require multiple pieces of information as input to the CHF. For example, the input to the CHF can include a reference to the previous (most recent) block in the blockchain, details of the transaction(s) that are to be included in the to be created block, and a nonce value (e.g., a random number used only once).

Multiple nodes can compete to hash a set of transactions and provide the next block that is to be added to the blockchain. The blockchain protocol provides a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain. Each miner provides the reference to the previous (most recent) block in the blockchain, details of the transaction(s) that are to be included in the to-be-created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain. Consequently, the respective miner's block is broadcast across the peer-to-peer network. All other miners cease work (because one miner was already successful), and all copies of the blockchain are updated across the peer-to-peer network to append the block to the blockchain. Each miner can be required to produce hundreds or thousands of hash values, before any one miner provides a qualifying hash value (e.g., at least the first four characters of the hash value are each zero).

In this example, demand nodes 214 (including demand nodes 1 216, demand node 2, 218, demand node 3 220, demand node 4 222, demand node 5 224, demand node 6 226, demand node N 230) can compete to manage a particular demand block. Custom block chain solutions can use different proof of work functions 232. For example, proof of work in the dynamic call center can include demonstrating the ability and readiness to manage the number of calls included in the demand block (that is, three users for demand block 1 202, six users for demand block 2 216, three users for demand block 3 210).

The ability to manage the number of calls can include verifying that the demand mining node includes the capability to queue the number of callers. The ability to manage the number of calls can also include demonstrating or verifying the ability to perform the required functions (such as the ability to play the recorded music, the ability to interface with a self-help function, and/or the ability to perform the necessary functions to match a caller with an available CSR). In some implementations, a cost can be associated with a particular demand mining node. The cost can be an out of pocket cost (for example, an amount charged to rent or use a particular node), the cost can also be an opportunity costs assigned by the call center. This cost can be used to prioritize the use of some mining nodes based on the mining node passing of performing the proof of work; demand blocks can be assigned to particular demand mining nodes. For example, demand block 1 202 can be assigned to demand node 3 220, demand block 2 206 can be assigned to demand node N 230, demand block 3 210 can be assigned to demand node 6 226.

Figure 3:
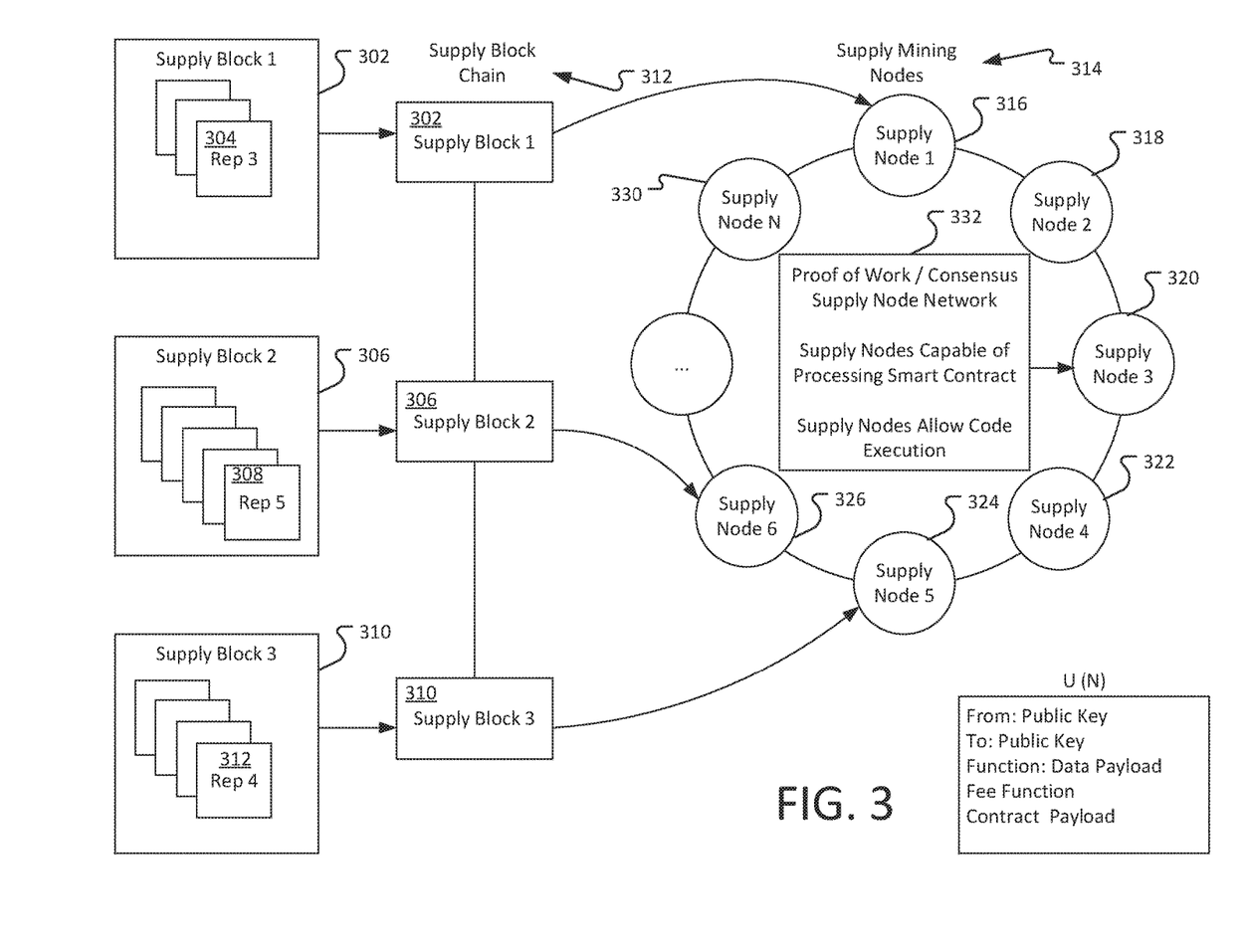
FIG. 3 illustrates a registering CSRs to be ready to answer calls.

FIG. 3 illustrates a registering CSRs to be ready to answer calls. CSRs who log into the system can be grouped into supply blocks. For example, supply block 1 302 includes 3

CRs 304, supply block 2 306 includes 5 CSRs 308, and supply block 3 includes 4 CSRs 310.

In this example, supply nodes 314 (including supply nodes 1 316, supply node 2 318, supply node 3 320, supply node 4 322, supply node 5 324, supply node 6 326, supply node N 330) can compete to manage a particular supply block.

CSR's can be grouped into supply blocks based on, for example, the time that they registered their availability with the system, their qualifications, their price, reputations, etc. The supply nodes compete to provide services to the supply blocks by executing a proof of work. The proof of work can be, for example, proof that the supply nodes have sufficient resources to manage the CSRs in the supply block. The proof of work can also include logging the CSRs into the system and identifying the capability or qualifications of the CSRs. The proof of work can also include verifying that the CSR has the necessary computing resources set up and ready to display caller information and address caller concerns. The proof of work calculation can also include matching a price of the members of the supply block with a current price being paid by the call center for calls.

In this example, supply block 1 302 is assigned to supply node 1 316, supply block 2 306 is assigned to supply node 6 326, supply block 3 310 is assigned to supply node 5 324.

Once a particular supply block and a demand block have been assigned to supply nodes and demand nodes respectively, the system can match the individual callers with individual customer service representatives as described below.

Figure 4:
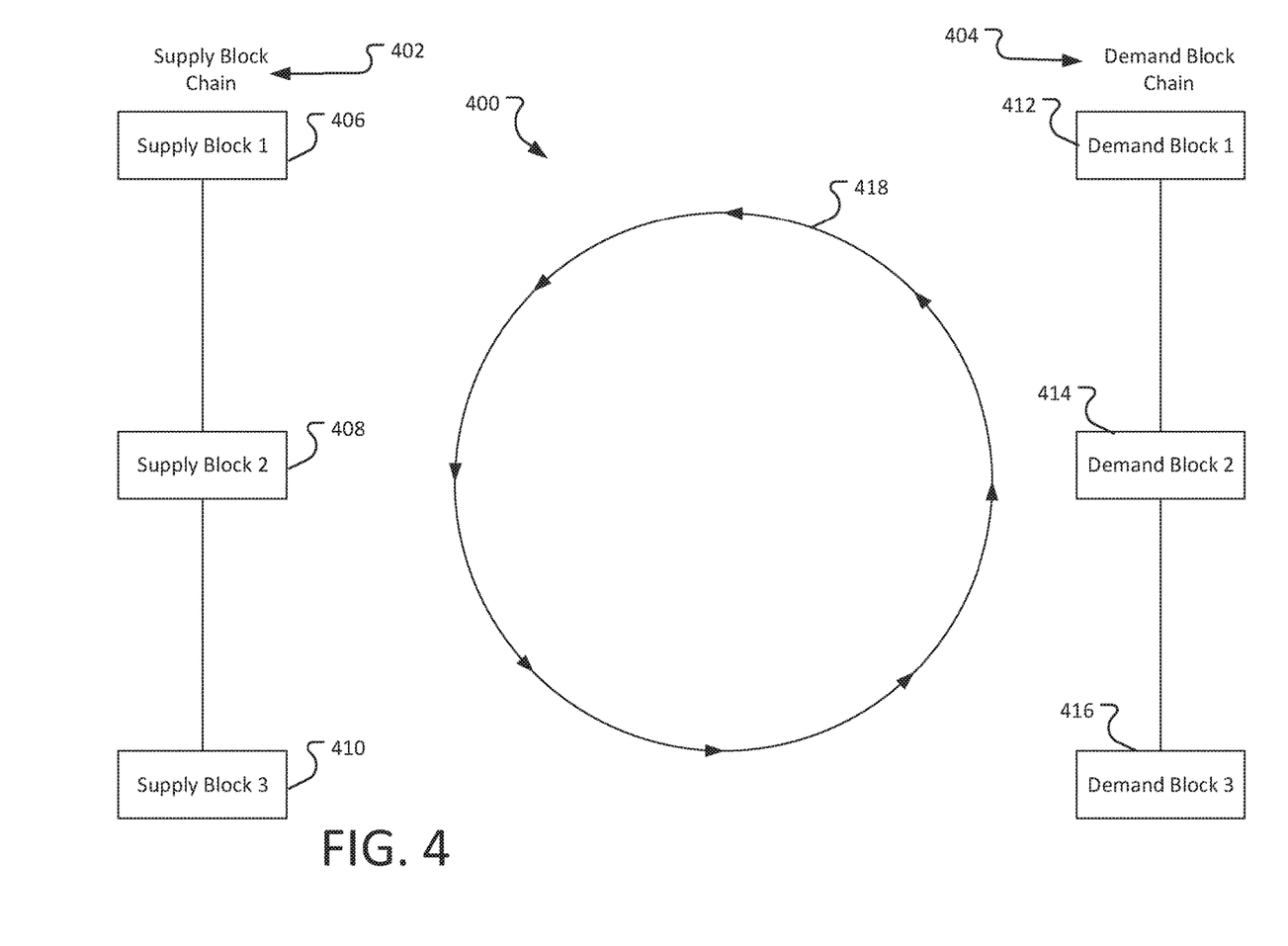
FIG. 4 illustrates an example system for matching supply blocks with demand blocks.

FIG. 4 illustrates an example system for matching supply blocks with demand blocks. The blocks in the supply block chain 402 can be matched with blocks in the demand chain 404 using a swarm algorithm 418.

Swarm algorithms describe collective behavior of decentralized, self-organized systems, natural or artificial. An agent can represent each caller and CSR. The agents interacting locally with one another and with their environment in order to associate a particular caller with a particular CSR. Each of the agents follows simple rules that allow callers and CSRs to be connected without a centralized control structure dictating how individual agents should behave. Some implementations can use a distributed hash table algorithm, such as KADEMLIA (a distributed hash table for decentralized peer-to-peer computer networks).

For example, callers and CSRs can be matched up based on call subject matter, reputation, price (as set by the CSR and by the call center), etc.

Figure 5:
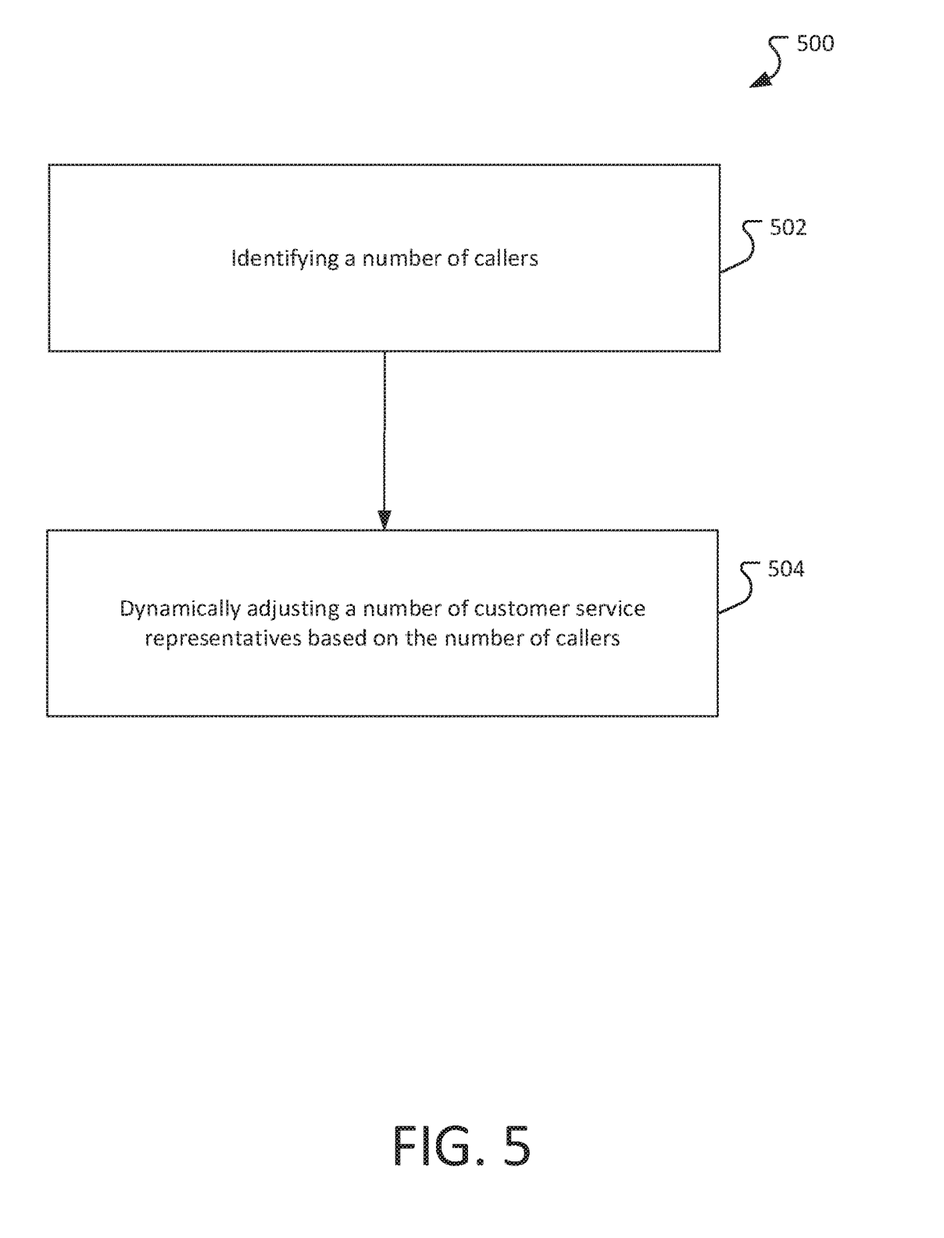
FIG. 5 is a flowchart of an example process 500 for a dynamic call center management.

FIG. 5 is a flowchart of an example process 500 for a dynamic call center management. The process 500 can be performed by a computer system executing computer instructions stored in a memory.

The process 500 identifies a number of callers. The callers can be grouped into a demand block based on the time the callers called a call center. For example, callers can be grouped into a demand block every 5-10 seconds. Each demand block can be assigned to a computer (referred to as a mining node) based on the computer demonstrating or verifying the ability to manage the number of callers in the block. For example, the mining node can need to verify that it can queue and provide automated services to the number of callers in the demand block.

The process 500 dynamically adjusts a number of customer service representatives based on the number of callers. In some implementations, the process 500 adjusts the number of customer services representatives by raising a bid for customer service representatives, for example, offering additional financial incentives to signing in and taking calls. In some implementations, the process 500 implements a market making function. For example, if the call center is relatively quiet, then fewer customer service representatives are needed. Consequently, the bid for customer service representatives can be relatively low. As more callers call, the demand for customer service representatives increases and the system can increase the bid accordingly. In some implementations, the bid can be adjusted based on a differential between the number of callers (the demand) and the number of available customer service representatives (the supply).

In some implementations, the system can notify customer services representatives based on the customer service representative's preferences. For example, a customer service representative can request a text message or other notification if the bid goes up to $1.00/call on Monday-Fridays between 10:00 AM and 2:00 PM.

In some implementations, the process 500 can match callers and customer services representatives using a swarm algorithm. For example, each caller and customer service representative can be represented by a digital agent which searches for a match between a caller and an available customer service representative. The digital agents can match on, for example, the necessary qualifications to handle the call, the bid associated with the call, and the ask associated with the customer service representative.

Customer service representatives can receive feedback that describes how they performed during a given session. For example, the customer service representative can receive a breakdown of their time on a call, their idle time between calls, their effective hourly rate, etc. Further, the customer service representative may receive advice on improving their hourly rate. In some scenarios, the customer service representatives ask may be a little too high and a small decrease in the ask may enable the customer service representative to increase their hourly rate. In some scenarios, the customer service representative may be lacking a qualification that would enable the representative to answer a larger number of calls.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs (i.e., one or more modules of computer program instructions, encoded on computer storage mediums for execution by, or to control the operation of, data processing apparatus). A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices). The computer storage medium can be non-transitory.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example, a programmable processor, a computer, a system on a chip, or multiple ones, or combinations, of the foregoing. The apparatus can include special purpose logic circuitry (e.g., an FPGA (field programmable gate array) or an ASIC (application-specific integrated circuit)). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural or object-oriented or functional languages, and it can be deployed in any form, including as a stand-alone program or as a module, component, subroutine, service, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA (field programmable gate array) or an ASIC (application-specific integrated circuit)).

Processors suitable for the execution of a computer program include, by way of example, both general and special purpose microprocessors, and any one or more processors of any kind of digital, analog or quantum computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive, data from or transfer data to, or both, one or more mass storage devices for storing data (e.g., electronic, magnetic, magneto-optical disks, or optical disks), however, a computer need not have such devices. Moreover, a computer can be embedded in another device (e.g., a mobile telephone, a personal digital assistant (PDA), a mobile audio or video player, a game console, a GPS receiver, or a portable storage device (e.g., a universal serial bus (USB) flash drive)), to name just a few. Devices suitable for storing computer program instructions and data include all forms of non-volatile memory, media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback) and input from the user can be received in any form, including acoustic, speech, or tactile input. In addition, a computer can interact with a user by sending documents to and receiving documents from a device that is used by the user (for example, by sending web pages to a web browser on a user's user device in response to requests received from the web browser).

Embodiments of the subject matter described in this specification can be implemented in a computing system that includes a back-end component (e.g., as a data server), a middleware component (e.g., an application server), or a front-end component (e.g., a user computer having a graphical user interface or a Web browser through which a user can interact with an implementation of the subject matter described in this specification), or any combination of one or more such back-end, middleware, or front-end components. The components of the system can be interconnected by any form or medium of digital or optical data communication (e.g., a communication network). Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what can be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can, in some cases, be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

The invention claimed is:

1. A computer-implemented method of coordinating callers with customer service representatives, the method comprising:
   identifying a number of callers at a given time;
   dynamically adjusting a number of customer service representatives available at the given time relative to a number of customer service representatives at a prior time based on the number of callers at the given time, wherein dynamically adjusting the number of customer service representatives comprises adjusting, at the given time and relative to a price to pay at the prior time, a price to pay at least one customer service representative for a call between at least one of the callers and the at least one customer service representative;
   assigning data representing a plurality of callers to a demand block of a block chain; and
   based on retrieval from the demand block of data representing at least one caller, matching the at least one caller of the plurality of callers with a customer service representative.

2. The computer-implemented method of claim 1, wherein dynamically adjusting the number of customer service representatives comprises:
   establishing a price for a call between one of the callers and one of the customer service representatives at the given time;
   determining the number of customer service representatives is insufficient for the number of callers at the given time; and
   increasing the price in accordance with the determining that the number of customer service representatives is insufficient for the number of callers.

3. The computer-implemented method of claim 1, wherein each of the plurality of callers is organized into the demand block of the block chain based at least partially on a time the caller called a call center.

4. The computer-implemented method of claim 1, further comprising organizing a plurality of customer service representatives into a supply block of a block chain based at least partially on the time the customer service representative indicated a wiliness to receive calls.

5. The computer-implemented method of claim 1, wherein matching the at least one caller with the customer service representative is based on at least one of: a type of call or a qualification of the customer service representative.

6. The computer-implemented method of claim 1, wherein matching the at least one caller with the customer service representative is based on at least one of: a bid or an ask.

7. A non-transitory computer storage medium encoded with computer program instructions that when executed by one or more computers cause the one or more computers to perform operations comprising:
   identifying a number of callers at a given time;
   dynamically adjusting a number of customer service representatives available at the given time relative to a number of customer service representatives at a prior time based on the number of callers at the given time, wherein dynamically adjusting the number of customer service representatives comprises adjusting, at the given time and relative to a price to pay at the prior time, a price to pay at least one customer service representative for a call between at least one of the callers and the at least one customer service representative;
   assigning data representing a plurality of callers to a demand block of a block chain; and
   based on retrieval from the demand block of data representing at least one caller, matching the at least one caller of the plurality of callers with a customer service representative.

8. The non-transitory computer storage medium of claim 7, wherein dynamically adjusting the number of customer service representatives comprises:
   establishing a price for a call between one of the callers and one of the customer service representatives at the given time;
   determining the number of customer service representatives is insufficient for the number of callers at the given time; and
   increasing the price in accordance with the determining that the number of customer service representatives is insufficient for the number of callers.

9. The non-transitory computer storage medium of claim 7, wherein each of the plurality of callers is organized into the demand block of the block chain based at least partially on a time the caller called a call center.

10. The non-transitory computer storage medium of claim 7, wherein the operations further comprise organizing a plurality of customer service representatives into a supply block of a block chain based at least partially on the time the customer service representative indicated a wiliness to receive calls.

11. The non-transitory computer storage medium of claim 7, wherein matching the at least one caller with the customer service representative is based on at least one of: a type of call or a qualification of the customer service representative.

12. The non-transitory computer storage medium of claim 7, wherein matching the at least one caller with the customer service representative is based on at least one of: a bid or an ask.

13. A system comprising:
   one or more computers and one or more storage devices storing instructions that are operable, when executed by the one or more computers, to cause the one or more computers to perform operations comprising
   identifying a number of callers at a given time;
   dynamically adjusting a number of customer service representatives available at the given time relative to a number of customer service representatives at a prior time based on the number of callers at the given time, wherein dynamically adjusting the number of customer service representatives comprises adjusting, at the given time and relative to a price to pay at the prior time, a price to pay at least one customer service representative for a call between at least one of the callers and the at least one customer service representative;

assigning data representing a plurality of callers to a demand block of a block chain; and based on retrieval from the demand block of data representing at least one caller, matching the at least one caller of the plurality of callers with a customer service representative.

14. The system of claim 13, wherein dynamically adjusting the number of customer service representatives comprises:

establishing a price for a call between one of the callers and one of the customer service representatives at the given time;

determining the number of customer service representatives is insufficient for the number of callers at the given time; and increasing the price in accordance with the determining that the number of customer service representatives is insufficient for the number of callers.

15. The system of claim 13, wherein each of the plurality of callers is organized into the demand block of the block chain based at least partially on a time the caller called a call center.

16. The system of claim 13, wherein the operations further comprise organizing a plurality of customer service representatives into a supply block of a block chain based at least partially on the time the customer service representative indicated a wiliness to receive calls.

17. The system of claim 13, wherein matching the at least one caller with the customer service representative is based on at least one of: a type of call or a qualification of the customer service representative.

18. The system of claim 13, wherein matching the at least one caller with the customer service representative is based on at least one of: a bid or an ask.

* * * * *